US010223608B2

(12) United States Patent
Aoyama et al.

(10) Patent No.: US 10,223,608 B2
(45) Date of Patent: Mar. 5, 2019

(54) OPTICAL COMMUNICATION APPARATUS, OPTICAL COMMUNICATION SYSTEM, AND OPTICAL COMMUNICATION METHOD

(71) Applicant: HONDA MOTOR CO., LTD., Tokyo (JP)

(72) Inventors: Chiaki Aoyama, Wako (JP); Tomoyuki Sahata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 178 days.

(21) Appl. No.: 15/470,106

(22) Filed: Mar. 27, 2017

(65) Prior Publication Data

US 2017/0286794 A1 Oct. 5, 2017

(30) Foreign Application Priority Data

Mar. 29, 2016 (JP) .................. 2016-065571

(51) Int. Cl.
*G06K 7/10* (2006.01)
*G06K 9/00* (2006.01)
(Continued)

(52) U.S. Cl.
CPC ........... *G06K 9/34* (2013.01); *G06K 7/10861* (2013.01); *G06K 9/00825* (2013.01); *G06K 9/03* (2013.01);
(Continued)

(58) Field of Classification Search
CPC . G06T 2207/30252; G06T 2207/30256; G06T 2207/30196; G06T 2207/20024;
(Continued)

(56) References Cited

U.S. PATENT DOCUMENTS 6,369,899 B1 * 4/2002 Hamada ............... H04N 5/2354
348/E5.038
6,744,380 B2 * 6/2004 Imanishi ................. B60R 1/00
340/937
(Continued)

FOREIGN PATENT DOCUMENTS

JP 4730444 4/2011

OTHER PUBLICATIONS

"Tracking objects using a laser scanner in driving situation based on modeling target shape"; Fadi Fayad; 2007 IEEE Intelligent Vehicles Symposium (Year: 2007).*
(Continued)

*Primary Examiner* — Michael S Osinski
(74) *Attorney, Agent, or Firm* — Rankin, Hill & Clark LLP

(57) ABSTRACT

An optical communication apparatus includes: a reception unit that receives, from a transmission apparatus which transmits a light signal including predetermined information, the transmitted light signal; a multipath removal unit that recognizes, when detecting a plurality of images having the same optical information in the received light signal, the light signal due to a reflection wave based on at least one of a luminance of the light signal, a size of an image corresponding to the light signal when receiving at the reception unit, and a propagation distance of the light signal and removes the light signal due to the reflection wave; and an control unit that acquires, from the light signal received by the reception unit, information based on the light signal obtained by removing the light signal due to the reflection wave by the multipath removal unit.

9 Claims, 11 Drawing Sheets

(51) Int. Cl.
*G06K 9/03* (2006.01)
*G06K 9/20* (2006.01)
*G06K 9/32* (2006.01)
*G06K 9/34* (2006.01)
*G06T 7/00* (2017.01)
*H04N 5/357* (2011.01)

(52) U.S. Cl.
CPC ............... *G06K 9/20* (2013.01); *G06K 9/325* (2013.01); *G06T 7/97* (2017.01); *H04N 5/3577* (2013.01); *G06K 2209/01* (2013.01); *G06K 2209/15* (2013.01)

(58) Field of Classification Search
CPC . G06T 2207/30261; G06T 7/586; G06T 7/55; G06T 7/97; G06T 15/06; G08G 1/166; G08G 1/0116; G08G 1/0141; G06K 9/34; G06K 9/325; G06K 9/20; G06K 7/97; G06K 7/10861; G06K 2209/15; G06K 2209/01; H04N 5/3577; B60R 2300/103; B60R 2300/106; B60R 2300/8066
See application file for complete search history.

(56) References Cited

U.S. PATENT DOCUMENTS

| | | | | |
|---|---|---|---|---|
| 8,032,034 B2* | 10/2011 | Yoshino | ................. | H04B 10/61 398/140 |
| 8,164,628 B2* | 4/2012 | Stein | ................. | G01C 3/22 348/148 |
| 9,203,514 B2* | 12/2015 | Deguchi | ................. | H04B 10/116 |
| 9,280,900 B2* | 3/2016 | Nomura | ................. | G08G 1/166 |
| 9,290,204 B2* | 3/2016 | Lavoie | ................. | B62D 13/06 |
| 9,714,826 B2* | 7/2017 | Higo | ................. | G06T 7/586 |
| 10,079,991 B2* | 9/2018 | Aoyama | ................. | G01S 17/00 |
| 2004/0247157 A1* | 12/2004 | Lages | ................. | G01S 17/89 382/103 |
| 2006/0228000 A1* | 10/2006 | Miyajima | ................. | G06T 17/05 382/104 |
| 2008/0167819 A1* | 7/2008 | Breed | ................. | G08G 1/161 701/300 |
| 2008/0273757 A1* | 11/2008 | Nakamura | ................. | G01C 21/26 382/104 |
| 2009/0078870 A1* | 3/2009 | Haruna | ................. | B60R 1/00 250/330 |
| 2009/0274470 A1* | 11/2009 | Yoshino | ................. | H04B 10/61 398/183 |
| 2012/0281028 A1* | 11/2012 | Orlick | ................. | G09G 3/3426 345/690 |
| 2013/0162462 A1* | 6/2013 | Lehning | ................. | G01S 13/58 342/104 |
| 2013/0272717 A1* | 10/2013 | Deguchi | ................. | H04B 10/116 398/154 |
| 2013/0279491 A1* | 10/2013 | Rubin | ................. | G08G 1/166 370/347 |
| 2015/0348314 A1* | 12/2015 | Koguchi | ................. | G06T 15/506 345/420 |
| 2015/0362312 A1* | 12/2015 | Higo | ................. | G06T 7/586 356/610 |
| 2016/0094771 A1* | 3/2016 | Kasahara | ................. | G06T 5/008 348/239 |
| 2016/0313244 A1* | 10/2016 | Shiono | ................. | G01N 21/49 |
| 2017/0023945 A1* | 1/2017 | Cavalcanti | ................. | G08G 1/0116 |
| 2017/0031009 A1* | 2/2017 | Davidovic | ................. | G01S 7/4865 |
| 2017/0090019 A1* | 3/2017 | Slobodyanyuk | ................. | G01S 7/4861 |
| 2017/0276766 A1* | 9/2017 | Aoyama | ................. | G01S 5/16 |
| 2017/0279594 A1* | 9/2017 | Aoyama | ................. | H04B 10/1143 |
| 2017/0280082 A1* | 9/2017 | Aoyama | ................. | G01S 17/00 |
| 2018/0011022 A1* | 1/2018 | Tahara | ................. | G01H 1/06 |
| 2018/0059219 A1* | 3/2018 | Irish | ................. | G01J 1/08 |
| 2018/0255240 A1* | 9/2018 | Kato | ................. | H04N 5/23232 |
| 2018/0284285 A1* | 10/2018 | Curatu | ................. | G01S 17/936 |

OTHER PUBLICATIONS

"An Accurate and Robust Strip-Edge-Based Structured Light Means for Shiny Surface Micromeasurement in 3-D"; Zhan Song; IEEE Transactions on Industrial Electronics, vol. 60, No. 3, Mar. 2013 (Year: 2013).*

* cited by examiner

| TYPE |
| --- |
| DATA |
| DATA ECC |
| LIGHT SOURCE GROUP POSITION |
| LIGHT SOURCE GROUP POSITION ECC |
| LIGHT SOURCE ELEMENT POSITION |
| LIGHT SOURCE ELEMENT POSITION ECC |

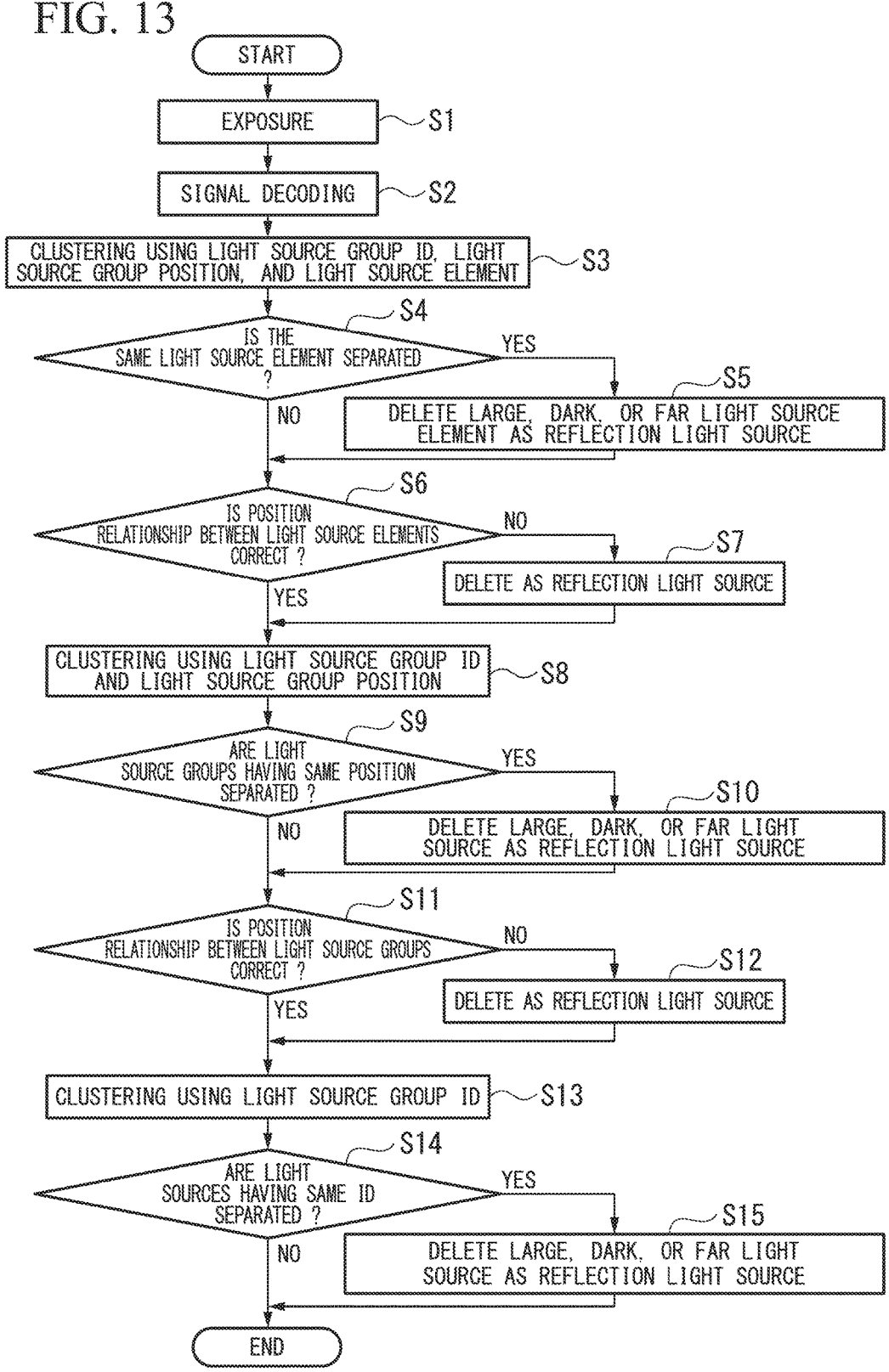

OPTICAL COMMUNICATION APPARATUS, OPTICAL COMMUNICATION SYSTEM, AND OPTICAL COMMUNICATION METHOD

CROSS-REFERENCE TO RELATED APPLICATION

Priority is claimed on Japanese Patent Application No. 2016-065571, filed on Mar. 29, 2016, the contents of which are incorporated herein by reference.

BACKGROUND

Field of the Invention

The present invention relates to an optical communication apparatus, an optical communication system, and an optical communication method.

Background

In the related art, communication systems using light or radio waves have been proposed. When such communication systems are used in, for example, electric toll collection (ETC) systems, there may be a case in which reflection of a transmitted signal occurs by a road surface, another vehicle, and the like. When reflection occurs, reflected waves are received at a receiver to thereby cause erroneous communications.

In such communication systems, techniques have been proposed in which a license number is read from a license plate of a vehicle, specific information transmitted from another vehicle via a communication antenna is received, the received specific information is compared with a database, and the read license number is compared with the database to thereby reduce the effect according to multipath reflection (for example, refer to Japanese Patent No. 4730444).

SUMMARY

However, according to the technique disclosed in Japanese Patent No. 4730444, although the effect of the multipath can be reduced by using a wireless communication, the above technique cannot be applied when an optical communication according to an LED and the like is used in between vehicles, between a road and a vehicle, and the like.

An object of an aspect of the present invention is to provide an optical communication apparatus, an optical communication system, and an optical communication method capable of reducing the effect of multipath in an optical communication.

(1) An optical communication apparatus according to an aspect of the present invention includes: a reception unit that receives, from a transmission apparatus which transmits a light signal including predetermined information, the transmitted light signal; a multipath removal unit that recognizes, when detecting a plurality of images having the same optical information in the received light signal, the light signal due to a reflection wave based on at least one of a luminance of the light signal, a size of an image corresponding to the light signal when receiving at the reception unit, and a propagation distance of the light signal and removes the light signal due to the reflection wave; and an control unit that acquires, from the light signal received by the reception unit, information based on the light signal obtained by removing the light signal due to the reflection wave by the multipath removal unit.

(2) In the above optical communication apparatus, the predetermined information may be a light source group ID that identifies a light source group formed of a plurality of light signals transmitted by the transmission apparatus, a light source group position that indicates a position of the light source group, and a light source element position that indicates a position of a light source element which forms the light source group, the predetermined information may be hierarchized, and the multipath removal unit may detect the light signal due to the reflection wave for each hierarchy that becomes receivable by the reception unit.

(3) In the above optical communication apparatus, the light signal may include light source groups having the same identifier, and the light signal of the light source groups having the same identifier may be formed of a plurality of light source elements and may include light source group position information and a plurality of light source element positions.

(4) In the above optical communication apparatus, the multipath removal unit may remove, from the light signal received by the reception unit, the light signal due to the reflection wave based on a position relationship of a plurality of the light source groups of which the light source group IDs are different from each other.

(5) In the above optical communication apparatus, the multipath removal unit may remove, from the light signal received by the reception unit, the light signal due to the reflection wave based on propagation distances of a plurality of the light source groups.

(6) In the above optical communication apparatus, the multipath removal unit may remove, from the light signal received by the reception unit, the light signal due to the reflection wave based on areas of images obtained by capturing a plurality of the light source groups.

(7) In the above optical communication apparatus, the multipath removal unit may remove, from the light signal received by the reception unit, the light signal due to the reflection wave based on luminance of a plurality of the light source groups.

(8) An optical communication system according to another aspect of the present invention is an optical communication system having an transmission apparatus and an optical communication apparatus, wherein the transmission apparatus transmits a light signal including predetermined information, which is a light source group ID that identifies a light source group formed of a plurality of light signals transmitted by the transmission apparatus, a light source group position that indicates a position of the light source group, and a light source element position that indicates a position of a light source element forming the light source group and is hierarchized, and wherein the optical communication apparatus includes: a reception unit that receives, from the transmission apparatus which transmits the light signal including the predetermined information, the transmitted light signal; a multipath removal unit that recognizes, when detecting a plurality of images having the same optical information in the received light signal, the light signal due to a reflection wave based on at least one of a luminance of the light signal, a size of an image corresponding to the light signal when receiving at the reception unit, and a propagation distance of the light signal and removes the light signal due to the reflection wave; and an control unit that acquires, from the light signal received by the reception unit, information based on the light signal obtained by removing the light signal due to the reflection wave by the multipath removal unit.

(9) An optical communication method according to another aspect of the present invention includes: (a) by way of a reception unit, receiving, from a transmission apparatus which transmits a light signal including predetermined information, the transmitted light signal; (b) by way of a multipath removal unit, recognizing, when detecting a plurality of images having the same optical information in the light signal received in (a), the light signal due to a reflection wave based on at least one of a luminance of the light signal, a size of an image corresponding to the optical signal when receiving at the reception unit, and a propagation distance of the light signal and removing the light signal due to the reflection wave; and (c) by way of an control unit, acquiring, from the light signal received in (a), information based on the light signal obtained by removing the light signal due to the reflection wave by the multipath removal unit.

The configuration (1), (8), or (9) described above provides an advantage that it is possible to remove a reflection wave in an optical communication and to therefore reduce the effect of multipath.

According to the configuration (2) described above, it is possible to distinguish the reflection wave in response to the hierarchy that becomes receivable.

According to the configuration (3) described above, for example, when a vehicle includes the optical transmission apparatus and is close to a vehicle ahead, it is possible to recognize the light source group ID, the light source group position, and the light source element. According to the configuration (3) described above, when the distance to the vehicle ahead that includes the transmission apparatus is a middle distance, it is possible to recognize the light source group ID and the light source group position.

According to the configuration (3) described above, when the distance to the vehicle ahead is distant, it is possible to recognize only the light source group ID. Accordingly, the configuration (3) described above provides an advantage that it is possible to appropriately detect a reflection image in each hierarchy recognizable by the reception unit.

According to the configuration (4) described above, it is possible to remove the reflection wave based on the position relationship of the light source groups, and therefore, it is possible to reduce the effect of multipath.

According to the configuration (5) described above, it is possible to remove the reflection wave based on the propagation distance of the light source group, and therefore, it is possible to reduce the effect of multipath.

According to the configuration (6) described above, it is possible to remove the reflection wave based on the area of the image obtained by capturing the light source group, and therefore, it is possible to reduce the effect of multipath.

According to the configuration (7) described above, it is possible to remove the reflection wave based on the luminance of the light source group, and therefore, it is possible to reduce the effect of multipath.

BRIEF DESCRIPTION OF THE DRAWINGS

FIG. 13 is a flowchart of a process performed by an optical communication apparatus according to the embodiment.

DESCRIPTION OF THE EMBODIMENTS

Hereinafter, an embodiment of the present invention is described with reference to the drawings.

Figure 1:
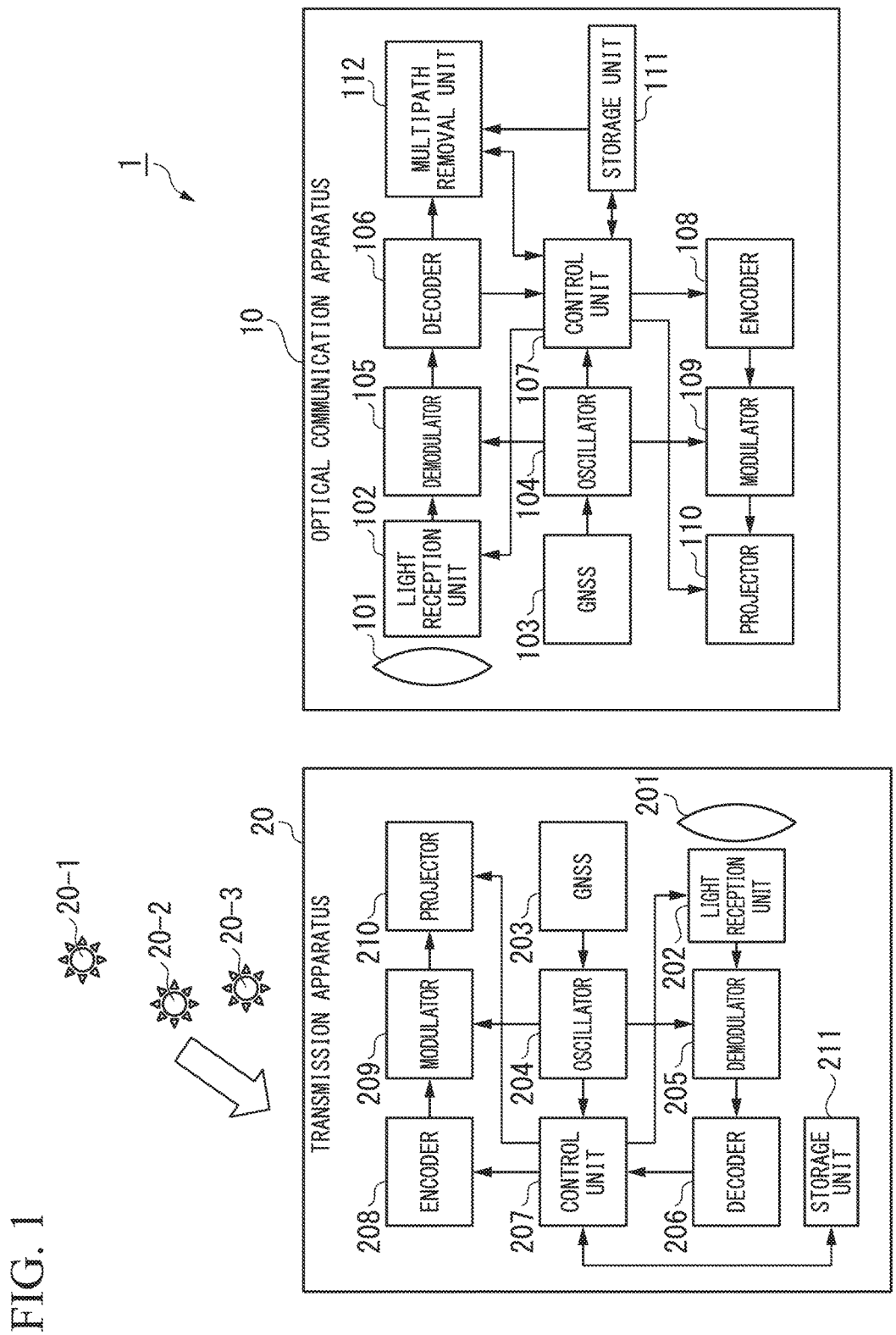
FIG. 1 is a system configuration view representing a configuration of an optical communication system according to an embodiment.

FIG. 1 is a system configuration view representing a configuration of an optical communication system 1 according to the present embodiment. As shown in FIG. 1, the optical communication system 1 includes an optical communication apparatus 10 and a first transmission apparatus 20-1, a second transmission apparatus 20-2, a third transmission apparatus 20-3, and the like. The following embodiment is described using an example in which the optical communication apparatus 10 is provided on a vehicle. In the following description, when one of the first transmission apparatus 20-1, the second transmission apparatus 20-2, the third transmission apparatus 20-3, and the like is not specified, the first transmission apparatus 20-1, the second transmission apparatus 20-2, the third transmission apparatus 20-3, and the like are simply referred to as a transmission apparatus 20.

As shown in FIG. 1, the optical communication apparatus 10 includes a lens 101, a light reception unit 102, a GNSS 103, an oscillator 104, a demodulator 105, a decoder 106, a control unit 107, an encoder 108, a modulator 109, a projector 110, a storage unit 111, and a multipath removal unit 112. Each of the lens 101, the light reception unit 102, and the projector 110 is provided at the front and at the rear with respect to the travel direction of the vehicle.

The transmission apparatus 20 includes a lens 201, a light reception unit 202, a GNSS 203, an oscillator 204, a demodulator 205, a decoder 206, a control unit 207, an encoder 208, a modulator 209, a projector 210, and a storage unit 211. The transmission apparatus 20 may have the same configuration as the optical communication apparatus 10. When the transmission apparatus 20 is provided on a vehicle, each of the lens 201, the light reception unit 202, and the projector 210 is provided at the front and at the rear with respect to the travel direction of the vehicle.

The transmission apparatus 20 is attached, for example, to a traffic light, a guardrail, an overpass, a pedestrian walkway, and another vehicle. In the following, an example is described in which the transmission apparatus 20 is attached to another vehicle. The transmission apparatuses 20 encode a signal including an identifier (ID) by which the apparatus is identified, a time code, a synchronization class, and information and transmit an optical beacon which is the encoded transmission signal to each other at a predetermined time. The synchronization class is information indicating a frequency accuracy of the oscillator 104 of the optical communication apparatus 10 or the oscillator 204 of the transmission apparatus 20. In the present embodiment, for example, a frequency accuracy of a level synchronized with the GNSS 103 is zero, a frequency accuracy of $10^{-10}$ or less is one, a frequency accuracy of more than $10^{-10}$ and $10^{-9}$ or less is two, and a frequency accuracy of $10^{-6}$ or more is three.

The optical communication apparatus 10 receives a transmission signal transmitted by the transmission apparatus 20 according to an optical communication. The optical communication apparatus 10 extracts information from the received transmission signal. The optical communication apparatus 10 calculates a distance between the transmission apparatus 20 and the vehicle including the optical communication apparatus 10 based on the received transmission signal. A signal included in the transmission signal is described below.

First, the transmission apparatus 20 is described.

The lens 201 causes a light beam including phase modulation light which is a transmission signal emitted by the optical communication apparatus 10 and environment light to pass through the lens 201, and the lens 201 forms an image of the light beam that has passed through the lens 201 on the light reception unit 202. The transmission apparatus 20 may include an optical filter in front of the projector or between the lens 201 and the light reception unit 202. When the filter is a polarization filter including circular polarization, it is possible to prevent reflection of odd number of times. When the filter is a bandpass filter, it is possible to reduce the effect of disturbance light or reduce a phenomenon in which an object looks red.

The light reception unit 202 has a structure in which a plurality of pixels are two-dimensionally arranged. The light reception unit 202 generates and accumulates an electric charge corresponding to the received light depending on the pixel and outputs, to the demodulator 205, the accumulated electric charge at a predetermined timing in response to the control of the control unit 207 as a reception signal.

The GNSS (Global Navigation Satellite System(s)) 203 is a positioning system using a satellite (not shown). The GNSS 203 extracts a reference signal from a signal received from the satellite and outputs the extracted reference signal to the oscillator 204.

The oscillator 204 corrects the generated synchronization signal corresponding to the reference signal input from the GNSS 203 and outputs the corrected synchronization signal to the demodulator 205, the control unit 207, and the modulator 209. Alternatively, the oscillator 204 generates the synchronization signal by using the reference signal output by the GNSS 203 and outputs the generated synchronization signal to the demodulator 205, the control unit 207, and the modulator 209.

The demodulator 205 performs demodulation with respect to the reception signal output by the light reception unit 202 corresponding to the modulation method used by the modulator 209 and outputs the demodulated reception signal to the decoder 206. The modulation method performed by the modulator 209 is, for example, a method such as the $2\pi/3$-DBPSK (Differential Binary Phase Shift Keying). The control of the pixel may be performed by the demodulator 205.

The decoder 206 decodes the reception signal demodulated by the demodulator 205 corresponding to the encoding used by the encoder 208 and outputs the decoded reception signal to the control unit 207.

The storage unit 211 stores an identifier (ID) by which the transmission apparatus 20 is identified, information used for modulation or encoding, and the like.

The control unit 207 controls the pixel included in the light reception unit 202. The control unit 207 controls the projector 210. The control unit 207 generates transmission information by using information stored by the storage unit 211 and outputs the generated transmission information to the encoder 208. The control unit 207 receives transmission information from the optical communication apparatus 10 output by the decoder 206 and extracts an ID and phase information of a carrier wave from the received transmission information. The control unit 207 acquires the delay time and the ID of the optical communication apparatus 10 output by the decoder 206. The control unit 207 outputs the delay time, the synchronization class, the time code, and the ID of the optical communication apparatus 10 to the encoder 208.

The encoder 208 encodes the transmission information output by the control unit 207 to generate a bit sequence.

The encoder 208 outputs the generated bit sequence to the modulator 209.

The modulator 209 modulates the bit sequence output by the encoder 208 by using the synchronization signal output by the oscillator 204, for example, in accordance with the DBPSK method to generate a carrier wave. The modulator 209 outputs the generated carrier wave to the projector 210. The modulation method performed by the modulator 209 is, for example, a method such as the $2\pi/3$-DBPSK (Differential Binary Phase Shift Keying). The modulation method performed by the modulator 209 is not limited to the $2\pi/3$-DBPSK modulation method.

The projector 210 performs phase modulation based on the carrier wave generated by the modulator 209 and transmits the phase modulation light which is a transmission signal applied with the phase modulation to the optical communication apparatus 10 in response to the control of the control unit 207. The projector 210 includes an LED (Light-Emitting Diode) or a laser diode capable of transmitting, for example, a visible light pulse having, for example, a high rate (repetition frequency). The projector 210 may include an LED or a laser diode transmitting an infrared light pulse having a high rate. When another vehicle includes the transmission apparatus 20, the projector 210 is attached to, for example, a position close to a brake lamp, a position close to each of right and left tail lamps of the vehicle including the transmission apparatus 20, and the like.

Next, the optical communication apparatus 10 is described.

The lens 101 causes a light beam including phase modulation light which is a transmission signal emitted by the transmission apparatus 20 and environment light to pass through the lens 101, and the lens 101 forms an image of the light beam that has passed through the lens 101 on the light reception unit 102. The optical communication apparatus 10 may include an optical filter between the lens 101 and the light reception unit 102. When the filter is a polarization filter including circular polarization, it is possible to prevent reflection of odd number of times. When the filter is a bandpass filter, it is possible to reduce the effect of disturbance light or reduce a phenomenon in which an object looks red.

The light reception unit 102 has a structure in which a plurality of pixels are two-dimensionally arranged. The light reception unit 102 generates an electric charge corresponding to the received light depending on the pixel and accumulates the generated electric charge at a predetermined timing in response to the control of the control unit 107. The light reception unit 102 outputs an image captured by the plurality of pixels in an exposure time to the demodulator 105. The light reception unit 102 outputs the received signal (hereinafter, referred to as a reception signal) to the demodulator 105.

The GNSS 103 extracts a reference signal from a signal received from the satellite and outputs the extracted reference signal to the oscillator 104.

The oscillator 104 corrects the generated synchronization signal corresponding to the reference signal input from the GNSS 103 and outputs the corrected synchronization signal to the demodulator 105, the control unit 107, and the encoder 108.

Alternatively, the oscillator 104 generates the synchronization signal by using the reference signal output by the GNSS 103 and outputs the generated synchronization signal to the demodulator 105, the control unit 107, and the encoder 108.

The demodulator 105 performs demodulation with respect to the reception signal output by the light reception unit 102 corresponding to the modulation method used by the modulator 209 of the transmission apparatus 20 and outputs the demodulated reception signal and an image output by the light reception unit 102 to the decoder 106. The control of the pixel may be performed by the demodulator 105.

The decoder 106 decodes the reception signal demodulated by the demodulator 105 corresponding to the encoding used by the encoder 208 of the transmission apparatus 20. The decoder 106 obtains the amplitude and phase of the reception signal. The decoder 106 outputs the image output by the demodulator 105, the obtained amplitude and phase, and the reception signal after decoding to the multipath removal unit 112.

The multipath removal unit 112 deletes (removes) a signal (also referred to as a multipath) based on a reflection wave from the reception signal after decoding based on the amplitude, the phase, and the image output by decoder 106 and outputs the reception signal from which the reflection wave is removed to the control unit 107. As described below, the multipath removal unit 112 removes, based on attribution (identifier of the light source group, position of the light source group) possessed by the reception signal, a propagation distance of the reception signal, a size of an image obtained by capturing the reception signal by the light reception unit 102, and the like, the signal based on a reflection wave. The light source group and a removal method are described below.

The control unit 107 controls the pixel included in the light reception unit 102. The control unit 107 controls the projector 110 to transmit a transmission signal. The control unit 107 acquires a reception signal output by the multipath removal unit 112 and extracts an ID, information, and phase information of the carrier wave from the acquired reception signal. The control unit 107 converts position information of the light reception unit which is a two-dimensional surface into angular information and then converts the position information into three-dimensional position information also by using distance information to obtain three-dimensional relative position information between vehicles.

Next, a configuration of the light reception unit 102 is described. The structure of the light reception unit 102 may be the same as or may be different from the structure of the light reception unit 202. In the following, an example is described in which the structure of the light reception unit 102 is the same as the structure of the light reception unit 202.

Figure 2:
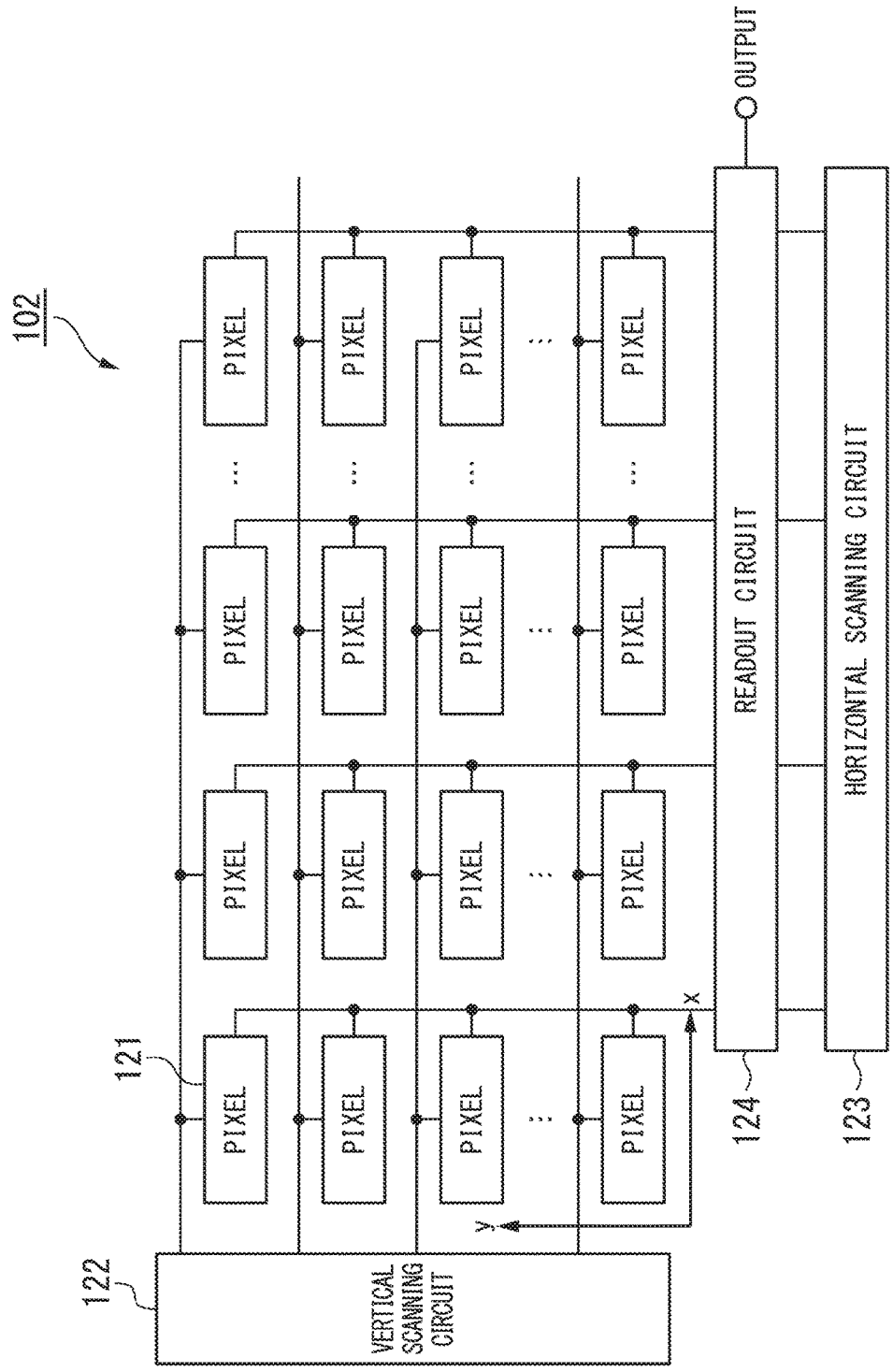
FIG. 2 is a schematic view representing a schematic configuration of a light reception unit according to the embodiment.

FIG. 2 is a schematic view representing a schematic configuration of the light reception unit 102 according to the present embodiment.

The light reception unit 102 includes a plurality of pixels 121, a vertical scanning circuit 122, a horizontal scanning circuit 123, and a readout circuit 124. The pixels 121 are arranged in a two-dimensional matrix form and receive light passing through the lens 101 to generate and accumulate an electric charge. The readout circuit 124 reads out a voltage level corresponding to the electric charges accumulated by each pixel 121 in response to the control by the vertical scanning circuit 122 and the horizontal scanning circuit 123. The voltage level which is read out is output to the demodulator 105 (FIG. 1) from the readout circuit 124. The total number of the pixels 121 is, for example, 1024×768 pixels.

In the present embodiment, when receiving a signal, the signal is read out after performing an exposure in response to the control of the control unit 107.

Next, an example of a transmission signal transmitted by the transmission apparatus 20 is described.

Figure 3:
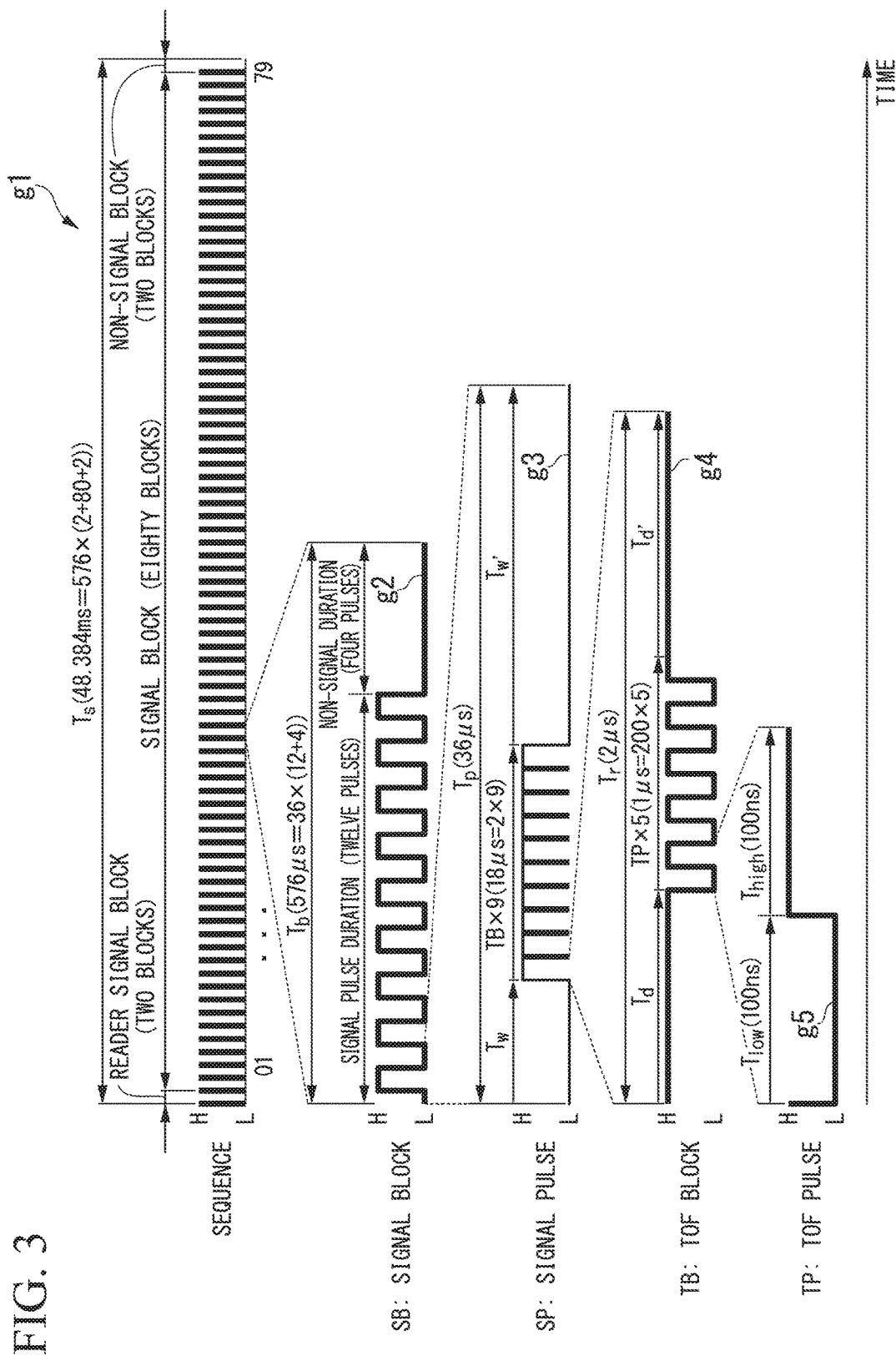
FIG. 3 is a view showing a configuration example of a transmission signal according to the embodiment.

FIG. 3 is a view showing a configuration example of the transmission signal according to the present embodiment. In FIG. 3, the horizontal axis represents time, and the vertical axis represents a H level and a L level of each signal.

As shown in FIG. 3, one sequence of a transmission signal g1 is formed of two reader signal blocks, eighty (n=0 to 79) signal blocks, and two non-signal blocks. One period $T_s$ of one sequence of the transmission signal g1 is 48.384 [msec] (=576 [μsec]×(2+80+2)). A non-signal duration of integral multiple of 2 μsec may be provided before and after the sequence in order to make the sequence number per one second an integer or in order to make signal periods have good separation.

The reader signal block is a block of a signal that represents the start of a signal block.

The signal block SB is a block of a signal in which transmission information is encoded and modulated.

The non-signal block is a block that represents the end of a signal block and is in a non-signal state.

A waveform g2 is an enlarged waveform of one signal block SB. The one signal block SB is formed of twelve signal pulses and four non-signals. Twelve signal pulses correspond to three ticks. One tick corresponds to four signal pulses.

A duration of a non-signal (also referred to as a non-signal duration) is a duration for four signal pulses. One signal pulse is 36 [μsec]. The non-signal duration is the duration for four signal pulses and therefore corresponds to one tick. Therefore, one period $T_b$ of the signal block is 576 [μsec] (=36 [μsec]×(12+4)). In the g2, the non-signal duration is the L level but may be the H level.

A waveform g3 is an enlarged waveform of one signal pulse SP. The one signal pulse SP is formed of a duration $T_w$ that represents a phase, nine TOF blocks, and a remaining duration $T_{w'}$. The duration of the TOF block TB is 18 [μsec]

(=2 [μsec]×9) since the duty is 50%. One period $T_r$ of the TOF block is a duration of (TP×5) (=1 [μsec])×2, that is, 2 [μsec]. The duration $T_w$ that represents a phase is 0 when the phase is 0 degree, is $T_p × ⅓$ when the phase is 120 degrees, and is $T_p × ⅔$ when the phase is 240 degrees. That is, a bit value is determined depending on the length of the duration $T_w$ that represents a phase.

A waveform g4 is an enlarged waveform of the TOF block TB. The one TOF block TB is formed of a delay duration $T_d$, five TOF pulses, and a remaining duration $T_{d'}$. The delay duration $T_d$ is a predetermined time.

A waveform g5 is an enlarged waveform of the TOF pulse TP. One period of the TOF pulse TP is 200 [nsec], the duration $T_{low}$ of the L level is 100 [nsec], and the duration $T_{high}$ of the H level is 100 [nsec].

The relationship among the one period $T_s$ of the sequence, the one period $T_b$ of the signal block SB, the one period $T_p$ of the signal pulse SP, the duration $T_w$ that represents a phase, the remaining duration $T_{w'}$, the one period $T_r$ of the TOF block TB, the delay duration $T_d$, the duration $T_{high}$ of the H level and the duration $T_{low}$ of the L level of the TOF pulse TP, and the remaining duration $T_{d'}$ shown in FIG. 3 is represented by the following Expression (1). The relationship of Expression (1) is determined based on an orthogonality condition.

$$\begin{aligned} T_s &= (2 + 80 + 2)T_b \\ T_b &= (12 + 4)T_p \\ T_p &= T_w + 9T_r + T_{w'} \\ T_r &= T_d + 5(T_{low} + T_{high}) + T_{d'} \end{aligned} \quad (1)$$

Next, an example of types of signals included in a transmission signal is described.

Figures 4, 5:
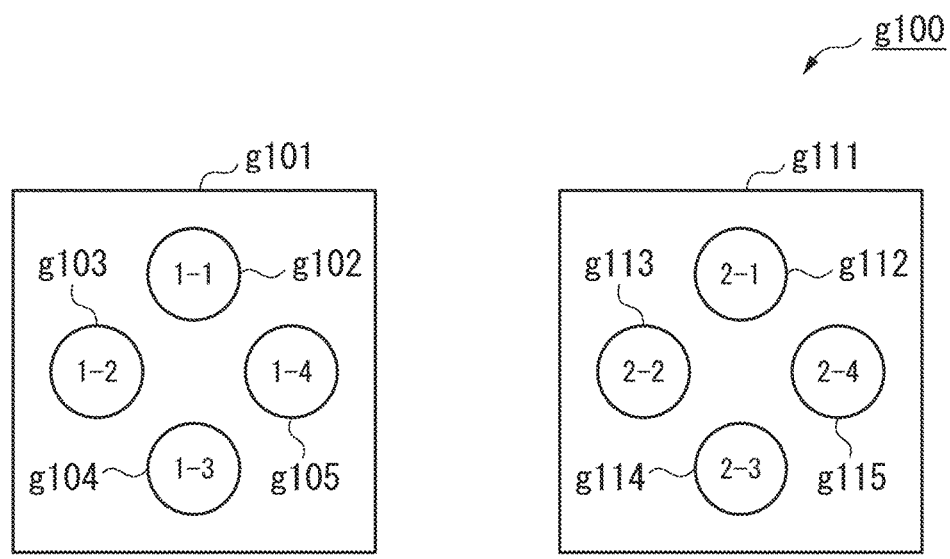
FIG. 4 is a view showing an example of types of signals included in the transmission signal according to the embodiment.
FIG. 5 is a view showing an example of a light source group and a light source element according to the embodiment.

FIG. 4 is a view showing an example of types of signals included in the transmission signal according to the present embodiment.

As shown in FIG. 4, the transmission signal includes, for example, data, a data ECC (Error Correcting Code), a light source group position, a light source group position ECC, a light source element position, and a light source element position ECC. The summation of bit numbers of the data, the data ECC, the light source group position, the light source group position ECC, the light source element position, and the light source element position ECC is 80 bits in the example shown in FIG. 3.

The data includes the ID of the optical communication apparatus 10, the synchronization class, the delay time, the position of the light source, and the like. The data ECC is an error correction code with respect to data. The light source group position is information that indicates a position of a light source group. The light source group position ECC is an error correction code with respect to a light source group position. The light source element position is information that indicates a position of an element of a light source. The light source element position ECC is an error correction code with respect to information that indicates a light source element position.

Next, the light source group and the light source element are described.

FIG. 5 is a view showing an example of the light source group and the light source element according to the present embodiment. In the example shown in FIG. 5, another vehicle including the transmission apparatus 20 is traveling in front of a vehicle including the optical communication apparatus 10. The projector 210 is provided in the vicinity of each of right and left tail lamps of another vehicle. The example shown in FIG. 5 is an image g100 obtained by the vehicle including the optical communication apparatus 10 by capturing a light signal transmitted by the transmission apparatus 20 using the light reception unit 102.

An image g101 is an image obtained by capturing a transmission signal transmitted by the projector 210 which is provided in the vicinity of the left tail lamp of another vehicle when seen from the vehicle including the optical communication apparatus 10.

An image g102 is an image obtained by capturing a transmission signal transmitted by the projector 210 which is provided in the vicinity of the right tail lamp of another vehicle when seen from the vehicle including the optical communication apparatus 10.

The image g101 includes images g102 to g105. The image g102 is an image obtained by receiving a transmission signal having an ID of 1-1. The image g103 is an image obtained by receiving a transmission signal having an ID of 1-2. The image g104 is an image obtained by receiving a transmission signal having an ID of 1-3. The image g105 is an image obtained by receiving a transmission signal having an ID of 1-4. The ID of M-N means that M represents the light source group and N represents the light source element. That is, the image g101 includes images obtained by receiving four transmission signals of which the light source group is 1 and the light source elements are 1 to 4. In this way, in the present embodiment, the light source element represents a subordinate hierarchy of the light source group.

The image g111 includes images g112 to g115. The image g112 is an image obtained by receiving a transmission signal having an ID of 2-1. The image g113 is an image obtained by receiving a transmission signal having an ID of 2-2. The image g114 is an image obtained by receiving a transmission signal having an ID of 2-3. The image g115 is an image obtained by receiving a transmission signal having an ID of 2-4. That is, the image g111 includes images obtained by receiving four transmission signals of which the light source group is 2 and the light source elements are 1 to 4.

As described with reference to FIG. 4, the transmission signal includes information indicating the above light source groups (for example, ID=1, 2, and the like) and light source elements (for example, ID of 1-1 to 1-4).

Next, an example of an image captured by the light reception unit 102 and a hierarchy of a detectable signal depending on the distance between a vehicle 12 (refer to FIG. 9) including the optical communication apparatus 10 and a vehicle 11 (refer to FIG. 9) including the transmission apparatus 20 are described.

Figure 6:
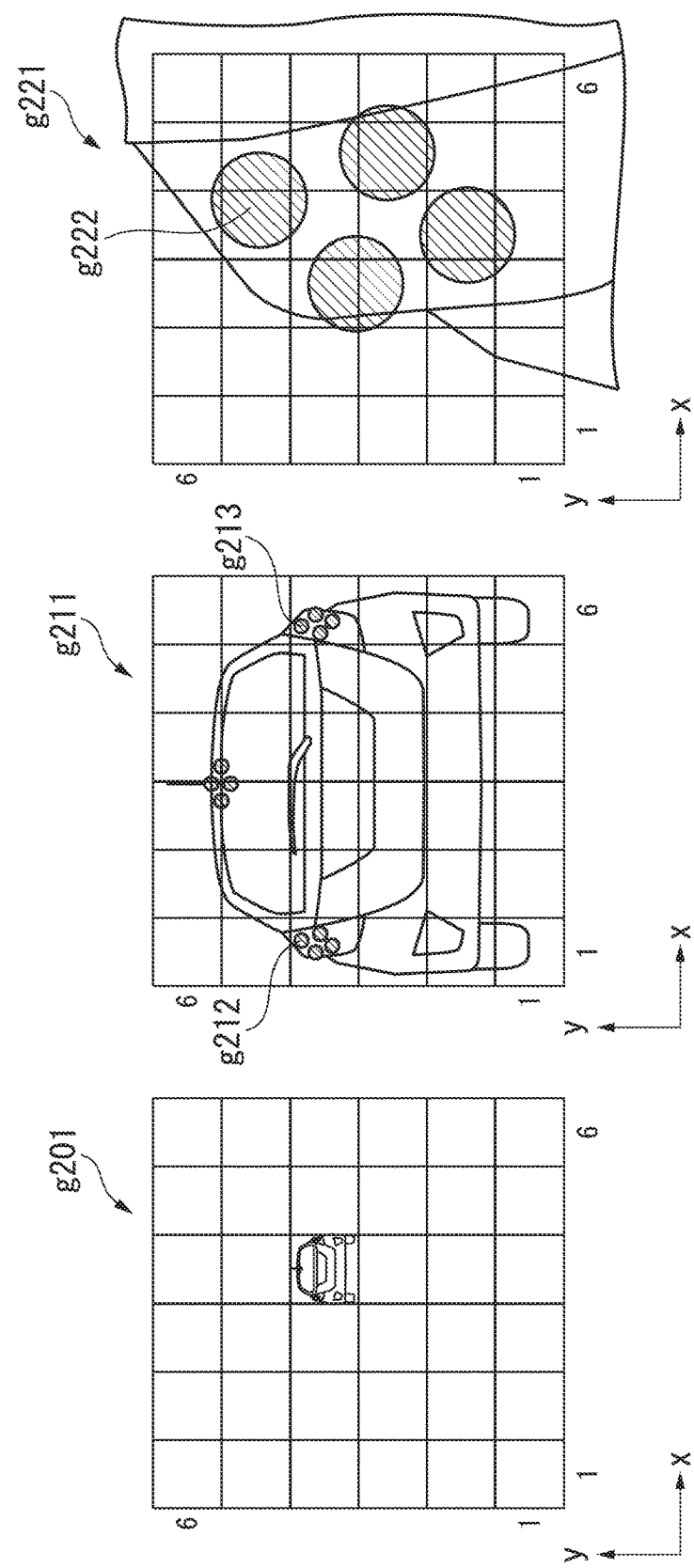
FIG. 6 is a view showing an example of an image captured by the reception unit and a hierarchy of a detectable signal according to the embodiment.

FIG. 6 is a view showing an example of an image captured by the light reception unit 102 and a hierarchy of a detectable signal according to the present embodiment. The example shown in FIG. 6 is a view of 6×6 pixels extracted partially from all pixels of the light reception unit 102 shown in FIG. 2. In FIG. 6, the coordinate of each pixel is represented by (x, y). The vehicle 11 transmits a plurality of transmission signals from the part close to the right tail lamp, the part close to the left tail lamp, and the part close to the brake lamp. The ID of the light source group of the left tail lamp of the vehicle 11 is 1, the ID of the light source group of the right tail lamp of the vehicle 11 is 2, and the ID of the light source group of the brake lamp of the vehicle 11 is 3.

The image g201 is an example in which light source groups of a plurality of light sources (transmission signal from the vehicle 11) are captured by one pixel of a coordinate (4, 4). In this case, the control unit 107 can detect only the data and the data ECC.

An image g211 is an example in which light source groups of a plurality of light sources are captured by separate pixels and a plurality of light source elements are captured by one pixel, for example, of a coordinate (1, 4) or a coordinate (6,4). As represented by reference numeral g212, for example, transmission signals from the light sources having an ID of 1-1 to 1-4 shown in FIG. 5 are captured by the pixel (1, 4). As represented by reference numeral g213, for example, transmission signals from the light sources having an ID of 2-1 to 2-4 shown in FIG. 5 are captured by the pixel (6, 4). In this case, the control unit 107 can detect the data, the data ECC, the light source group position, and the light source group position ECC.

An image g221 is an example in which light source elements of one light source group are captured by separate pixels. Reference numeral g222 represents images of the light source elements (ID=1-1 to 1-4). In this case, each of four light source elements is captured by a different pixel, and therefore, the control unit 107 can detect the data, the data ECC, the light source group position, the light source group position ECC, the light source element position, and the light source element position ECC.

Next, an example of an image captured when capturing a reflected light source group is described.

Figure 7:
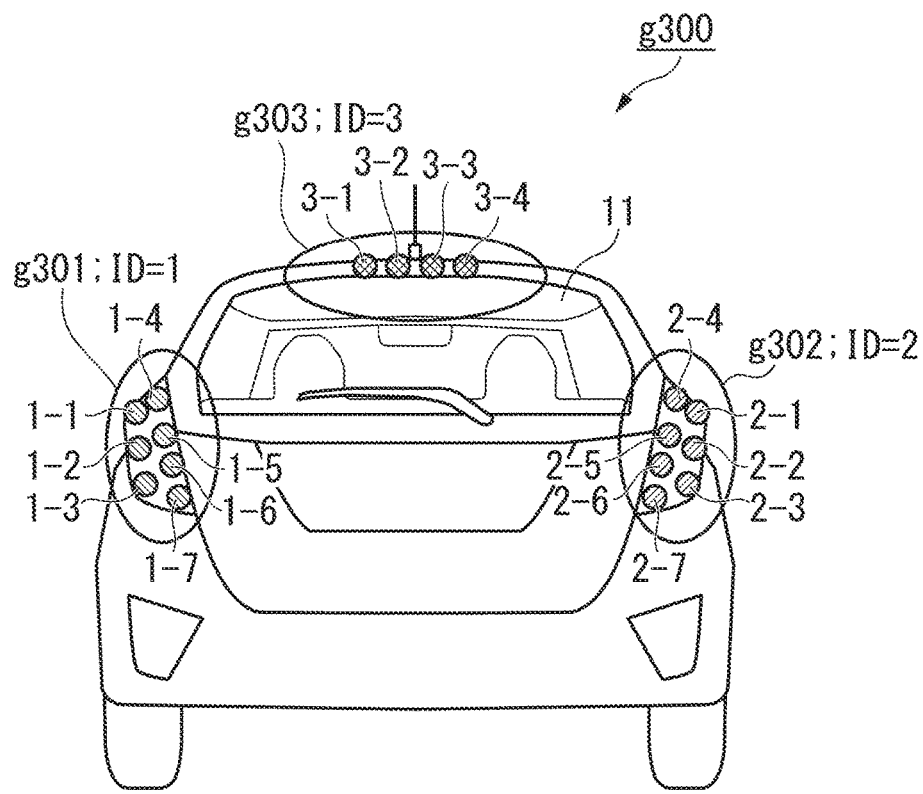
FIG. 7 is a view showing an example of an image captured when capturing a light source group reflected at a road surface according to the embodiment.
Figure 7:
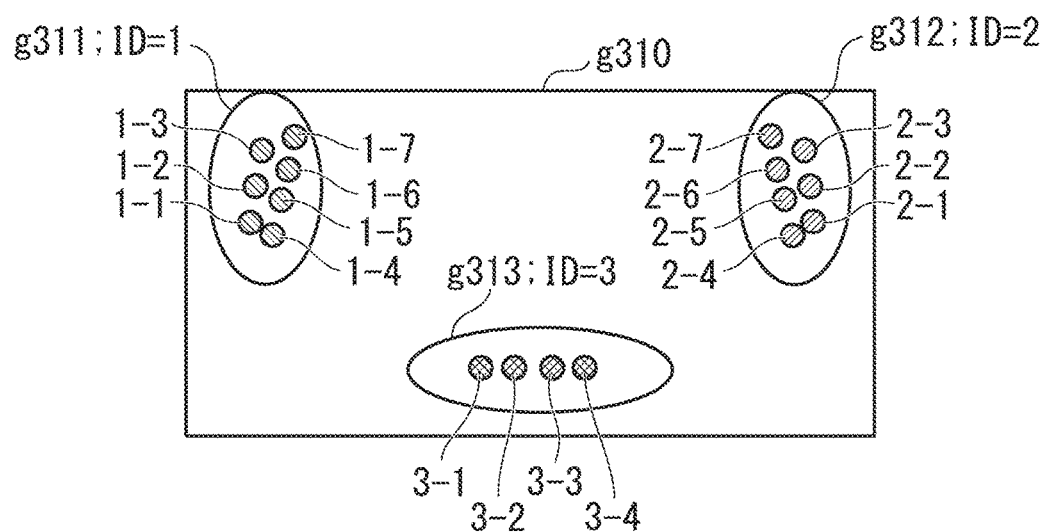
Figure 8:
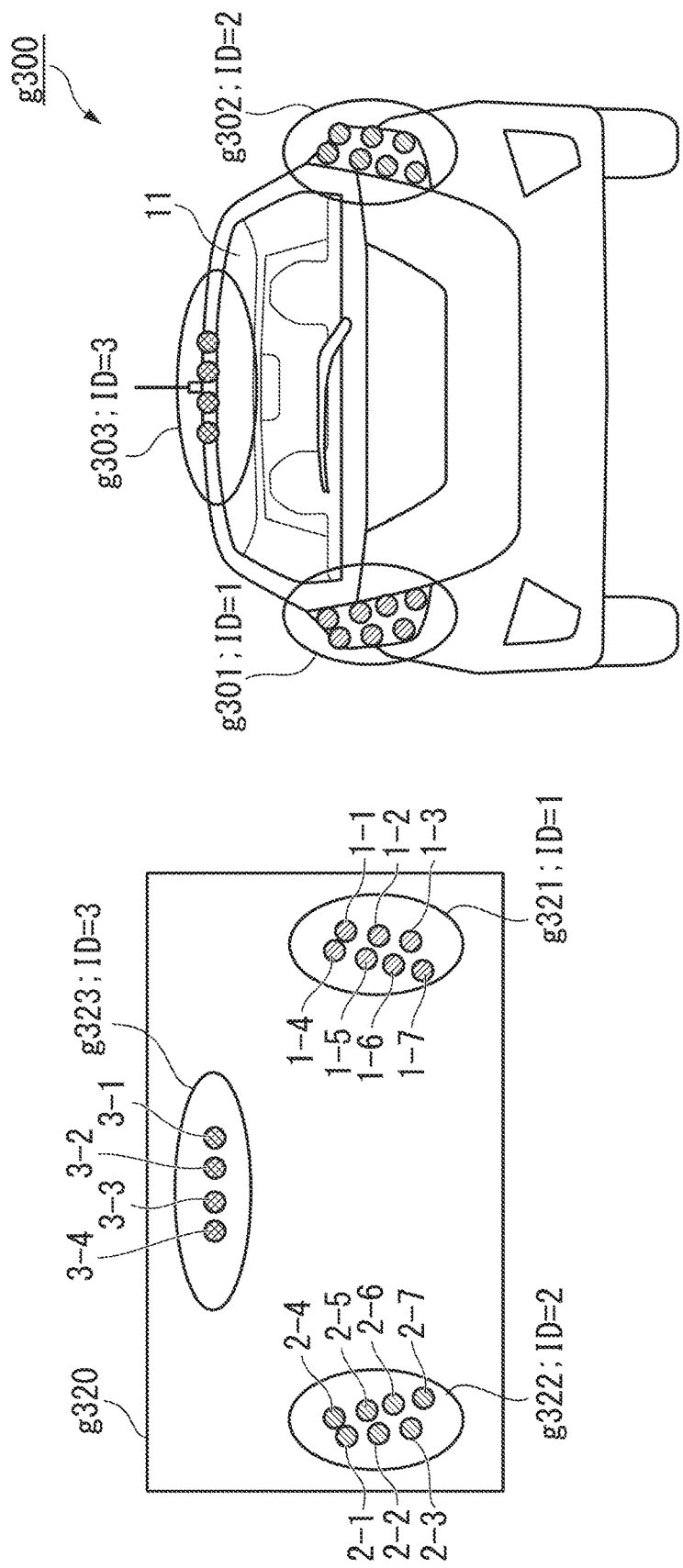
FIG. 8 is a view showing an example of an image captured when capturing a light source group reflected at a wall surface according to the embodiment.

FIG. 7 is a view showing an example of an image captured when capturing a light source group reflected at a road surface according to the present embodiment. FIG. 8 is a view showing an example of an image captured when capturing a light source group reflected at a wall surface according to the present embodiment.

Images of regions represented by reference numeral g300 of FIG. 7 and FIG. 8 represent the light source of the vehicle 11. The ID of the light source group of the left tail lamp of the vehicle 11 is 1, the ID of the light source group of the right tail lamp of the vehicle 11 is 2, and the ID of the light source group of the brake lamp of the vehicle 11 is 3. The light source group having an ID of 1 includes light source elements of 1 to 7 as shown by a region represented by reference numeral g301. The light source group having an ID of 2 includes light source elements of 1 to 7 as shown by a region represented by reference numeral g302. The light source group having an ID of 3 includes light source elements of 1 to 4 as shown by a region represented by reference numeral g303.

In FIG. 7 and FIG. 8, when seen from the vehicle 12, the light source group having an ID of 1 is located at a left position as represented by reference numeral g301, the light source group having an ID of 2 is located at a right position with respect to the light source group ID1 as represented by reference numeral g302, and the light source group having an ID of 3 is located at an upper position with respect to the light source groups ID1 and ID2 as represented by reference numeral g303. When the light reception unit 102 captures an image of a light source group without reflection, an arrangement of the image represented by reference numeral g300 is captured by the light reception unit 102.

First, a case of reflection by a road surface and the like is described with reference to FIG. 7. An image of a region represented by reference numeral g310 of FIG. 7 represents an example of an image due to a reflection wave by a road surface and the like captured by the light reception unit 102.

When the light source group reflected by the road surface and the like is captured by the light reception unit 102, the light source group having an ID of 1 is located at a left position as represented by reference numeral g311, the light source group having an ID of 2 is located at a right position with respect to the light source group ID1 as represented by reference numeral g312, and the light source group having an ID of 3 is located at a lower position with respect to the light source groups ID1 and ID2 as represented by reference numeral g313. That is, the vertical position relationship between the light source group of ID=3 and the light source group of ID=1 or ID=2 is reversed. As shown in images of regions represented by reference numeral g300 and reference numeral g310, for example, with respect to the vertical position relationship of the light source groups having an ID of 1-1 and 1-3, the light source group of ID=1-1 is located at an upper position than the light source group of ID=1-3 in an image without reflection, and the light source group of ID=1-3 is located at an upper position than the light source group of ID=1-1 in an image with reflection.

Such a position relationship of the light source groups is described in the light source group position.

In this way, the multipath removal unit 112 determines that the image in which the vertical positions are reversed is an image due to a reflection wave based on the light source group position included in the transmission signal and removes a transmission signal due to a reflection light of the road surface and the like. The multipath removal unit 112 may determine that the image in which the vertical positions are reversed is an image due to a reflection wave based on the position of the light source group element included in the transmission signal and may remove a transmission signal due to a reflection light of the road surface and the like.

Next, a case of reflection by a wall surface and the like is described with reference to FIG. 8. An image of a region represented by reference numeral g320 of FIG. 8 represents an example of an image due to a reflection wave by a wall surface and the like captured by the light reception unit 102.

When the light source group reflected by the wall surface and the like is captured by the light reception unit 102, the light source group having an ID of 1 is located at a right position as represented by reference numeral g321, the light source group having an ID of 2 is located at a left position with respect to the light source group ID1 as represented by reference numeral g322, and the light source group having an ID of 3 is located at an upper position with respect to the light source groups ID1 and ID2 as represented by reference numeral g323. That is, the horizontal position relationship between the light source groups of ID=1 and ID=2 is reversed. As shown in images of regions represented by reference numeral g300 (FIG. 7) and reference numeral g320, for example, with respect to the horizontal position relationship of the light source groups having an ID of 1-1 and 1-4, the light source group of ID=1-1 is located at a more left position than the light source group of ID=1-4 in an image without reflection, and the light source group of ID=1-1 is located at a more right position than the light source group of ID=1-4 in an image with reflection. The arrangement in the horizontal direction of the light source elements of ID=3 is also reversed.

In this way, the multipath removal unit 112 determines that the image in which the horizontal positions are reversed is an image due to a reflection wave based on the light source group position included in the transmission signal and removes a transmission signal due to a reflection light of the wall surface and the like. The multipath removal unit 112 may determine that the image in which the horizontal positions are reversed is an image due to a reflection wave based on the position of the light source group element included in the transmission signal and may remove a transmission signal due to a reflection light of the wall surface and the like.

The number of light source groups, the number of light source elements, and the like shown in FIG. 7 and FIG. 8 are examples and are not limited thereto.

Next, a measurement method of a distance between the vehicle 12 including the optical communication apparatus 10 and the vehicle 11 including the transmission apparatus 20 is described.

Figure 9:
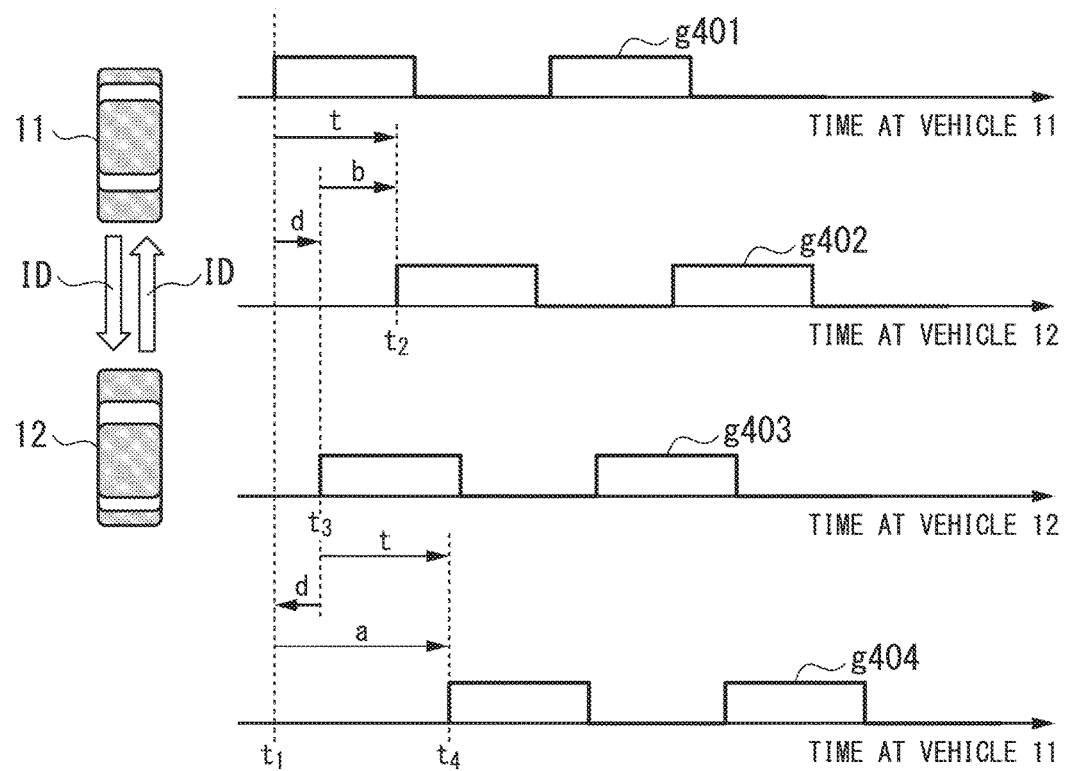
FIG. 9 is a view showing a mutual communication between vehicles and a measurement method of a distance according to the embodiment.

FIG. 9 is a view showing a mutual communication between vehicles and a measurement method of a distance according to the present embodiment. In FIG. 9, the vertical axis represents whether the signal is a H (high) level or is a L (low) level, and the horizontal axis represents time. In the example shown in FIG. 9, the vehicle 11 is traveling in front of the vehicle 12 with respect to the travel direction of the vehicle 12.

A waveform g401 represents a transmission signal emitted by the vehicle 11. A waveform g402 represents a reception signal obtained by the vehicle 12 receiving the transmission signal emitted by the vehicle 1. A waveform g403 represents a transmission signal emitted by the vehicle 11. A waveform g403 represents a transmission signal emitted by the vehicle 12. A waveform g404 represents a reception signal obtained by the vehicle 11 receiving the transmission signal emitted by the vehicle 12.

A time $t_1$ represents the timing when the vehicle 11 emits light. A time $t_2$ represents the timing when the vehicle 12 receives the light emitted by the vehicle 11. A time $t_3$ represents the timing when the vehicle 12 emits light. A time $t_4$ represents the timing when the vehicle 11 receives the light emitted by the vehicle 12.

Further, "t" represents a true delay time. "b" represents a delay time measured by using a reference time of the vehicle 12. "d" represents a synchronization error. In the present embodiment, the synchronization error is also referred to as a phase error. "a" represents a delay time measured by using a reference time of the vehicle 11. In the present embodiment, "a" and "b" are also referred to as an apparent delay time.

As shown in FIG. 9, the true delay time t is represented by the following Expression (2) and Expression (3).

$$b+d=t \quad (2)$$

$$a-d=t \quad (3)$$

According to Expression (2) and Expression (3), a+b=2t is obtained, and the true delay time t is represented by the following Expression (4). According to Expression (2) and Expression (3), the synchronization error d is represented by the following Expression (5).

$$t=(a+b)/2 \quad (4)$$

$$d=(a-b)/2 \quad (5)$$

The transmission signal is a light signal, and therefore, an inter-vehicle distance L between the vehicle 11 and the vehicle 12 can be obtained by conversion using the following Expression (6). In Expression (6), "c" is the speed of light (299,792,458 [m/s]).

$$L=t\cdot c \quad (6)$$

In this way, by transmitting the apparent delay times (a, b) to each other between the vehicles, the vehicle 11 and the vehicle 12 can calculate the inter-vehicle distance between the vehicle 11 and the vehicle 12. Then, the transmission apparatus 20 and the optical communication apparatus 10 can calculate the true delay time t according to Expression (2) or Expression (3) by using the calculated synchronization error d and the apparent delay time obtained for each optical communication. The transmission apparatus 20 and the optical communication apparatus 10 transmit and receive the apparent delay time via an optical communication.

Next, a method of determining a reflection wave based on a distance between vehicles is described with reference to FIG. 10 and FIG. 11.

Figure 10:
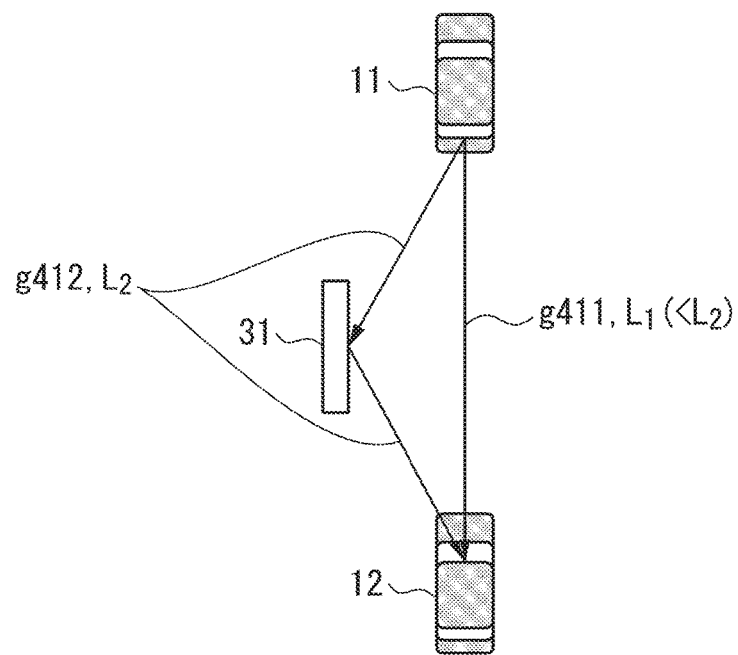
FIG. 10 is a view showing a relationship of a reflection wave, a distance, and a delay time between vehicles according to the embodiment.
Figure 11:
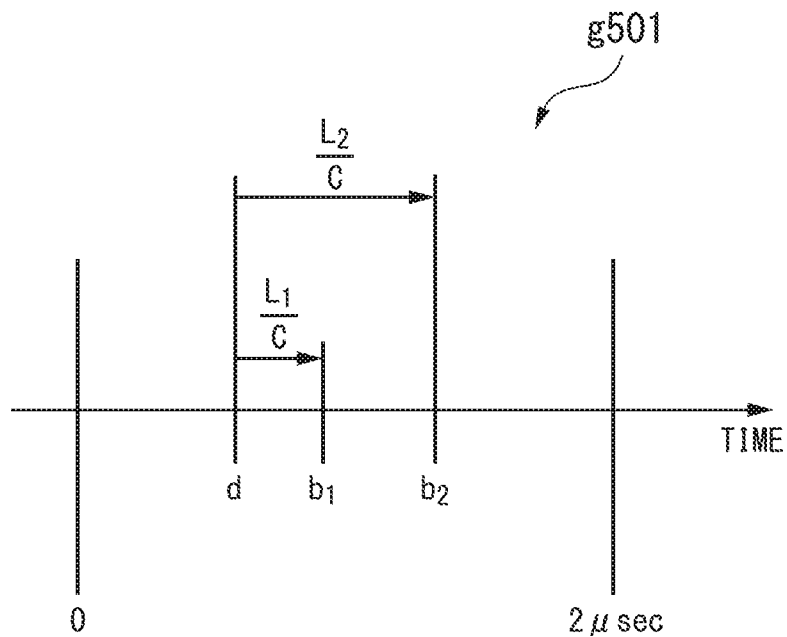
FIG. 11 is a view showing a relationship of the reflection wave, the distance, and the delay time between vehicles according to the embodiment.
Figure 11:
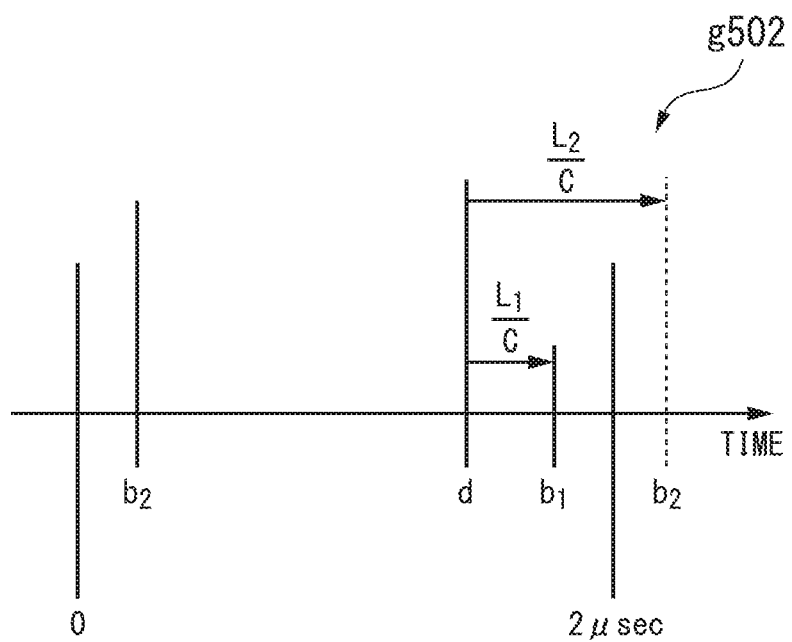

FIG. 10 and FIG. 11 are views showing a relationship of a reflection wave, a distance, and a delay time between vehicles according to the present embodiment. In the example shown in FIG. 10 and FIG. 11, the vehicle 11 is traveling in front of the vehicle 12 with respect to the travel direction of the vehicle 12 similarly to FIG. 9.

In FIG. 10, reference numeral 31 represents a wall surface, reference numeral g411 represents a direct wave from the vehicle 11, and reference numeral g412 represents a reflection wave reflected at the wall surface 31 from the vehicle 11. The propagation distance of the direct wave is $L_1$, and the propagation distance of the reflection wave is $L_2$. The wave g412 is a reflection wave, and therefore, the propagation distance $L_2$ is longer than the propagation distance $L_1$.

Next, the relationship of the synchronization error, the delay time, and the distance is described.

The view of a region represented by reference numeral g501 of FIG. 11 is a view showing a case in which $(d+L_2/c)$ is less than 2 μsec. The view of a region represented by reference numeral g502 of FIG. 11 is a view showing a case in which $(d+L_2/c)$ is 2 μsec or more. In FIG. 11, the horizontal axis represents time. "d" represents a synchronization error of the vehicle 12 with respect to the vehicle 11. "$b_1$" represents a delay time when there is no reflection. "$b_2$" represents a delay time when there is reflection. "c" represents the speed of light. "2 μsec" is the duration of the TOF block described with reference to FIG. 3 and corresponds to, for example, an inter-vehicle distance of 600 m.

In a situation where multipath (reflection) occurs, the time difference between a direct wave and a reflection wave that have similar luminance does not become 1 μsec or more. This is because, when the difference is 1 μsec or more, the distance difference is large, and the luminance of the reflection wave is dramatically decreased in the captured image. The multipath removal unit 112 can determine whether or not the inter-vehicle distance is a distance which causes a difference of 1 μsec or more based on the detected luminance. Thereby, the multipath removal unit 112 can detect the reflection wave only from the relationship of the delay time without a mutual communication of the detected delay time.

When $(d+L_2/c)$ is less than 2 μsec, the relationship of the delay time is a relationship of $b_1<b_2$ as shown in the view of the region represented by reference numeral g501.

When $(d+L_2/c)$ is 2 μsec or more, the relationship of the delay time is a relationship of $b_2<b_1$ because $b_2$ exceeds 2 μsec, that is, because of folding as shown in the view of the region represented by reference numeral g502.

Therefore, when $|b_1-b_2|$ is less than 1 μsec, one having a greater value of the delay time $b_1$ and the delay time $b_2$ corresponds to a farther position, that is, the reflection wave.

When $|b_1-b_2|$ is 1 μsec or more, one having a smaller value of the delay time $b_1$ and the delay time $b_2$ corresponds to a farther position, that is, the reflection wave.

The multipath removal unit 112 can also determine whether or not a wave is a reflection wave based on such a relationship.

Next, a method of determining a reflection wave based on the size and luminance of an image based on a transmission signal is described.

Figure 12:
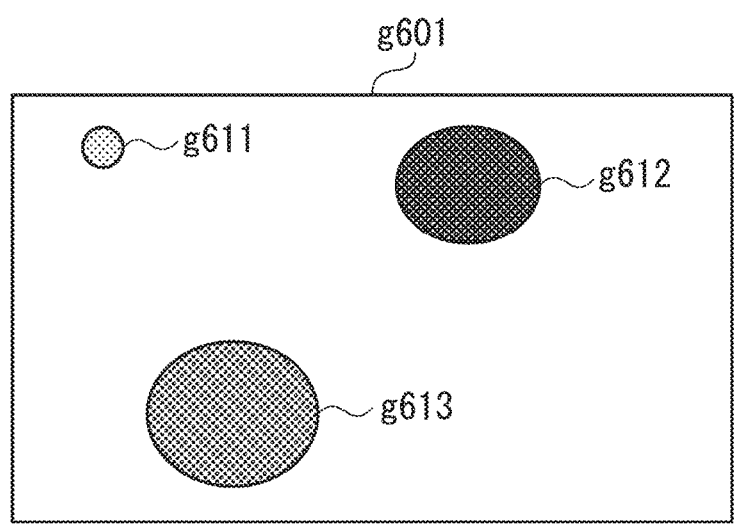
FIG. 12 is a view showing an example of the size and luminance of an image based on the transmission signal according to the embodiment.

FIG. 12 is a view showing an example of the size and luminance of an image based on the transmission signal according to the present embodiment. In FIG. 12, an image g601 is an image captured by the light reception unit 102. An image g611 is a first image obtained by capturing a transmission signal. An image g612 is a second image obtained by capturing a transmission signal. An image g613 is a third image obtained by capturing a transmission signal. In FIG. 12, all the images g611, g612, g613 are transmission signals of the same ID. In the example shown in FIG. 12, the luminance of the image g611 is the highest, the luminance of the image g612 is lower than the luminance of the image g611 and is higher than the luminance of the image g613, and the luminance of the image g613 is the lowest.

The multipath removal unit 112 detects the images g611, g612, and g613 from the captured image g601. Subsequently, the multipath removal unit 112 reads out the ID from the transmission signal that corresponds to each of the images g611, g612, and g613. Subsequently, the multipath removal unit 112 detects the luminance and area of each of the images g611, g612, and g613. The multipath removal unit 112 calculates the area, for example, as shown below. The multipath removal unit 112 performs clustering based on the amplitude obtained by the decoder 106 and calculates the area for each cluster.

The multipath removal unit 112 compares the luminance of the images g611, g612, and g613 and compares the area of the images g611, g612, and g613. The multipath removal unit 112 determines that an image of a region having the largest aperture and the lowest luminance is an image due to a reflection wave among images having the same ID. In FIG. 12, the multipath removal unit 112 determines that the image g611 is an image due to a direct wave (direct light) since the image g611 has the smallest area and the highest luminance and determines that the image g612 and the image g613 having a larger area and a lower luminance than the image g611 are images due to a reflection wave (multipath).

The multipath removal unit 112 may determine that the image is an image due to a reflection wave based on at least one of the area and the luminance.

Next, an example of a process sequence performed by the optical communication apparatus 10 is described.

FIG. 13 is a flowchart of a process performed by the optical communication apparatus 10 according to the present embodiment. In the following process, the optical communication apparatus 10 receives a transmission signal from the transmission apparatus 20.

(Step S1) The control unit 107 controls the light reception unit 102 so as to perform an exposure and capture an image according to a transmission signal.

(Steps S2) The decoder 106 performs decoding with respect to the exposed transmission signal.

(Step S3) The multipath removal unit 112 detects information indicating each of the light source group ID, the light source group position, and the light source element from the signal of each region based on a result of decoding by the decoder 106.

Subsequently, the multipath removal unit 112 performs clustering, for example, by using a k-average algorithm using the detected light source group ID, light source group position, and light source element.

(Step S4) The multipath removal unit 112 determines whether or not the same light source element is classified into different clusters and is separated. The multipath removal unit 112 causes the process to proceed to Step S5 when it is determined that the same light source element is separated (Step S4; YES) and causes the process to proceed to Step S6 when it is determined that the same light source element is not separated (Step S4; NO).

(Step S5) The multipath removal unit 112 compares the luminance of the light source elements separated from the same light source element, compares the area of the light source elements separated from the same light source element, and compares the distance of the light source elements separated from the same light source element. Subsequently, the multipath removal unit 112 determines that a region having the smallest area and the highest luminance is a direct wave. Subsequently, the multipath removal unit 112 determines that a light source element having a larger area and a lower (darker) luminance than the direct wave (direct light) or a light source element having a farther distance is a reflection wave (multipath) and deletes (removes) the light source element.

(Step S6) The multipath removal unit 112 determines whether or not the position relationship (vertical and horizontal) between the light source elements is correct. The position relationship between the light source elements is, for example, a position relationship described with reference to FIG. 7 and FIG. 8. The multipath removal unit 112 causes the process to proceed to Step S8 when it is determined that the position relationship between the light source elements is correct (Step S6; YES) and causes the process to proceed to Step S7 when it is determined that the position relationship between the light source elements is not correct (Step S6; NO).

(Step S7) The multipath removal unit 112 determines that a light source group having light source elements having an incorrect position relationship between the light source elements is a reflection light source and deletes the light source group. The multipath removal unit 112 causes the process to proceed to Step S8.

(Step S8) The multipath removal unit 112 performs clustering, for example, by using a k-average algorithm using the detected light source group ID and light source group position.

(Step S9) The multipath removal unit 112 determines whether or not the light source groups having the same position are classified into different clusters and are separated. The multipath removal unit 112 causes the process to proceed to Step S10 when it is determined that the light source groups having the same position are separated (Step S9; YES) and causes the process to proceed to Step S11 when it is determined that the light source groups having the same position are not separated (Step S9; NO). For example, when the image captured by the light reception unit 102 includes the images g301 to g303 of the image g300 (FIG. 7) and the images g311 to g313 of the image g310 (FIG. 7), the light source groups having the same position is the light source groups ID=1-1 having the same position included in the image g301 and the image g311.

(Step S10) The multipath removal unit 112 compares the luminance of the light source groups having the same position, compares the area of the light source groups having the same position, and compares the distance of the light source groups having the same position. Subsequently, the multipath removal unit 112 determines that a region having the smallest area and the highest luminance is a direct wave. Subsequently, the multipath removal unit 112 determines that a light source having a larger area and a lower luminance than the direct wave (direct light) or a light source having a farther distance is a reflection wave (multipath) and deletes (removes) the light source.

(Step S11) The multipath removal unit 112 determines whether or not the position relationship (vertical and horizontal) between the light source groups is correct. The multipath removal unit 112 causes the process to proceed to Step S13 when it is determined that the position relationship between the light source groups is correct (Step S11; YES) and causes the process to proceed to Step S12 when it is determined that the position relationship between the light source groups is not correct (Step S11; NO).

(Step S12) The multipath removal unit 112 determines that light source groups having an incorrect position relationship between the light source groups are reflection light sources and deletes the light source groups. The multipath removal unit 112 causes the process to proceed to Step S13.

(Step S13) The multipath removal unit 112 performs clustering, for example, by using a k-average algorithm using the detected light source group ID.

(Step S14) The multipath removal unit 112 determines whether or not the light source groups having the same ID are classified into different clusters and are separated. The multipath removal unit 112 causes the process to proceed to Step S15 when it is determined that the light source groups having the same ID are separated (Step S14; YES) and ends the process when it is determined that the light source groups having the same ID are not separated (Step S14; NO).

(Step S15) The multipath removal unit 112 compares the luminance of the light source groups having the same ID, compares the area of the light source groups having the same ID, and compares the distance of the light source groups having the same ID. Subsequently, the multipath removal unit 112 determines that a region having the smallest area and the highest luminance is a direct wave. Subsequently, the multipath removal unit 112 determines that a light source having a larger area and a lower luminance than the direct wave (direct light) or a light source having a farther distance is a reflection wave (multipath) and deletes (removes) the light source. After deletion, the multipath removal unit 112 ends the process.

The reason for performing a process for each hierarchy of the light source group as shown in FIG. 13 is that information included in one pixel, which is detectable among the light source group ID, the light source group position, and the light source element, is different depending on the inter-vehicle distance as described with reference to FIG. 6.

The optical communication apparatus 10 may perform the process of Steps S1 to S15 described above, for example, for each period of exposure of all pixels 121 or for each period of exposure of pixels 121 in a region having a predetermined number of pixels set by the control unit 107 or the multipath removal unit 112.

The above embodiment is described using an example in which an optical communication is performed; however, the embodiment is not limited thereto. When the transmission signal is a radio wave, similarly to the present embodiment, a transmitter may transmit a plurality of transmission signals as a group, and the transmission signal may include information of the group position and the group element or the like as shown in FIG. 4. Then, a receiver may distinguish between a direct wave and a reflection wave by using the information and may remove the reflection wave.

As described above, in the present embodiment, in an optical communication, reflection light is detected and is deleted from an image captured by the light reception unit 102 by using at least one of the luminance, the area, the position relationship (horizontal and vertical) of the light source group, and the distance. Thereby, the present embodiment provides an advantage that it is possible to remove a reflection wave in an optical communication and to therefore reduce the effect of multipath.

According to the present embodiment, it is possible to distinguish the reflection image in response to the hierarchy that becomes receivable by the light reception unit 102.

Further, according to the present embodiment, for example, when a vehicle includes the optical transmission apparatus 10 and is close to a vehicle ahead, it is possible to recognize the light source group ID, the light source group position, and the light source element. Further, according to the present embodiment, when the distance to the vehicle ahead is a middle distance, it is possible to recognize the light source group ID and the light source group position. Further, according to the present embodiment, when the distance to the vehicle ahead is distant, it is possible to recognize only the light source group ID. Accordingly, the present embodiment provides an advantage that it is possible to appropriately detect a reflection image in each hierarchy recognizable by the reception unit 102.

Further, according to the present embodiment, it is possible to remove the reflection wave based on the position relationship of the light source groups, and therefore, it is possible to reduce the effect of multipath.

Further, according to the present embodiment, it is possible to remove the reflection wave based on the propagation distance of the light source group, and therefore, it is possible to reduce the effect of multipath.

Further, according to the present embodiment, it is possible to remove the reflection wave based on the area of the image obtained by capturing the light source group, and therefore, it is possible to reduce the effect of multipath.

Further, according to the present embodiment, it is possible to remove the reflection wave based on the luminance of the light source group, and therefore, it is possible to reduce the effect of multipath.

A program for realizing at least one of the functions included in the optical communication apparatus 10 or the transmission apparatus 20 in the embodiment of the invention may be recorded in a computer-readable recording medium, and the program recorded in the recording medium may be read into and executed on a computer system to thereby perform a process. It is assumed that the "computer system" used herein includes an OS or hardware such as peripherals. It is also assumed that the term "computer system" includes a WWW system including a homepage provision environment (or a display environment). The term "computer-readable recording medium" refers to a portable medium such as a flexible disk, a magneto-optical disk, a ROM, and a CD-ROM, or a storage device such as a hard disk embedded in the computer system. It is also assumed that the term "computer-readable recording medium" includes a medium which holds a program for a given time such as a volatile memory (RAM) in the computer system which becomes a server or a client when a program is transmitted through a network such as the Internet or a communication line such as a telephone line.

The program may be transmitted from the computer system which stores the program in the storage device or the like to other computer systems through a transmission medium or through transmission waves in the transmission medium. The term "transmission medium" which transmits the program refers to a medium which has a function of transmitting information, for example, a network (communication network) such as the Internet or a communication line such as a telephone line. The program may be a program which can realize part of the above-described functions. The program may be a so-called differential file (differential program) which can realize the above-described functions by a combination with a program already recorded in the computer system.

Although the embodiment of the invention has been described and shown in the drawings, the invention is not limited to the above-described embodiment, and addition, omission, and substitution of the configuration and other changes can be made without departing from the scope of the invention.

The invention claimed is:

1. An optical communication apparatus, comprising:
   a reception unit that receives, from a transmission apparatus which transmits a light signal including predetermined information, the transmitted light signal;
   a multipath removal unit that recognizes, when detecting a plurality of images having the same optical information in the received light signal, a light signal due to a reflection wave based on at least one of a luminance of the light signal, a size of an image corresponding to the light signal when receiving at the reception unit, and a propagation distance of the light signal and removes the light signal due to the reflection wave; and
   an control unit that acquires, from the light signal received by the reception unit, information based on the light signal obtained by removing the light signal due to the reflection wave by the multipath removal unit.

2. The optical communication apparatus according to claim 1, wherein
   the predetermined information is a light source group ID that identifies a light source group formed of a plurality of light signals transmitted by the transmission apparatus, a light source group position that indicates a position of the light source group, and a light source element position that indicates a position of a light source element which forms the light source group,
   the predetermined information is hierarchized, and
   the multipath removal unit detects the light signal due to the reflection wave for each hierarchy that becomes receivable by the reception unit.

3. The optical communication apparatus according to claim 1, wherein
   the light signal includes light source groups having the same identifier, and
   the light signal of the light source groups having the same identifier is formed of a plurality of light source elements and includes light source group position information and a plurality of light source element positions.

4. The optical communication apparatus according to claim 2, wherein
   the multipath removal unit removes, from the light signal received by the reception unit, the light signal due to the reflection wave based on a position relationship of a plurality of the light source groups of which the light source group IDs are different from each other.

5. The optical communication apparatus according to claim 2, wherein
   the multipath removal unit removes, from the light signal received by the reception unit, the light signal due to the reflection wave based on propagation distances of a plurality of the light source groups.

6. The optical communication apparatus according to claim 2, wherein
   the multipath removal unit removes, from the light signal received by the reception unit, the light signal due to the reflection wave based on areas of images obtained by capturing a plurality of the light source groups.

7. The optical communication apparatus according to claim 2, wherein
   the multipath removal unit removes, from the light signal received by the reception unit, the light signal due to the reflection wave based on luminance of a plurality of the light source groups.

8. An optical communication system having an transmission apparatus and an optical communication apparatus, wherein
   the transmission apparatus transmits a light signal including predetermined information, which is a light source group ID that identifies a light source group formed of a plurality of light signals transmitted by the transmission apparatus, a light source group position that indicates a position of the light source group, and a light source element position that indicates a position of a light source element forming the light source group and is hierarchized, and wherein
   the optical communication apparatus comprises:
      a reception unit that receives, from the transmission apparatus which transmits the light signal including the predetermined information, the transmitted light signal;
      a multipath removal unit that recognizes, when detecting a plurality of images having the same optical information in the received light signal, a light signal due to a reflection wave based on at least one of a luminance of the light signal, a size of an image corresponding to the light signal when receiving at the reception unit, and a propagation distance of the light signal and removes the light signal due to the reflection wave; and
      an control unit that acquires, from the light signal received by the reception unit, information based on the light signal obtained by removing the light signal due to the reflection wave by the multipath removal unit.

9. An optical communication method, comprising:
   (a) by way of a reception unit, receiving, from a transmission apparatus which transmits a light signal including predetermined information, the transmitted light signal;
   (b) by way of a multipath removal unit, recognizing, when detecting a plurality of images having the same optical information in the light signal received in (a), a light signal due to a reflection wave based on at least one of a luminance of the light signal, a size of an image corresponding to the optical signal when receiving at the reception unit, and a propagation distance of the light signal and removing the light signal due to the reflection wave; and
   (c) by way of an control unit, acquiring, from the light signal received in (a), information based on the light signal obtained by removing the light signal due to the reflection wave by the multipath removal unit.

* * * * *